United States Patent [19]
Turner

[11] 3,745,475
[45] July 10, 1973

[54] MEASUREMENT SYSTEM
[75] Inventor: John W. Turner, Huntsville, Ala.
[73] Assignee: The United States of America as represented by the Administrator of the National Aeronautics and Space Administration, Washington, D.C.
[22] Filed: Dec. 7, 1971
[21] Appl. No.: 205,675

[52] U.S. Cl.................... 328/134, 328/48, 328/129, 324/79 D
[51] Int. Cl........................................... G01r 23/10
[58] Field of Search...................... 328/134, 140, 48, 328/129; 324/79 D

[56] References Cited
UNITED STATES PATENTS
| | | | |
|---|---|---|---|
| 2,992,384 | 7/1961 | Malbrain........................ | 324/79 D X |
| 3,071,725 | 1/1963 | McWaid.......................... | 324/79 D |
| 3,206,684 | 9/1965 | Der et al........................ | 328/134 X |
| 3,412,329 | 11/1968 | Granquist........................ | 324/79 D |
| 3,450,991 | 6/1969 | Tarczy-Hornock................ | 324/79 D |
| 3,564,284 | 2/1961 | Kamens........................... | 328/134 X |
| 3,609,326 | 9/1971 | Bagley............................ | 324/79 D X |

Primary Examiner—John S. Heyman
Attorney—L. D. Wofford, Jr., G. J. Parter and J. R. Manning

[57] ABSTRACT

A measurement system for providing an indication of a varying physical quantity represented by or converted to a variable frequency signal. Timing pulses are obtained marking the duration of a fixed number, or set, of cycles of the sampled signal and these timing pulses are employed to control the period of counting of cycles of a higher fixed and known frequency source. The counts of cycles thus obtained from the fixed frequency source provide a precise measurement of the average frequency of each set of cycles sampled, and thus successive discrete values of the quantity being measured. The frequency of the known frequency source is made such that each measurement is presented as a direct digital representation of the quantity measured.

5 Claims, 2 Drawing Figures

John W. Turner,
INVENTOR

BY George J. Porter
ATTORNEY

John W. Turner,
INVENTOR

3,745,475

MEASUREMENT SYSTEM

ORIGIN OF THE INVENTION

The invention described herein was made by an employee of the United States and may be manufactured and used by or for the Government of the United States of America for Governmental purposes without the payment of any royalties thereon or therefor.

BACKGROUND OF THE INVENTION

This invention relates to measurement systems in which the frequency of a signal is detected by counting techniques and particularly to a new and improved system for sequentially sampling and measuring frequency, or a quantity represented by a frequency, where the frequency of the signal involved varies over a fairly wide range and wherein the frequencies are not greatly higher than the sampling rate.

GENERAL DESCRIPTION OF THE PRIOR ART

Measurements of physical quantities are frequently made through detectors or transducers which respond by providing an electrical signal output which varies in frequency as a function of variation in the quantity of the physical function being observed. The varying frequency electrical signal is then measured and scaled, by counting or other techniques, to provide a direct reading or mesurement of the physical quantity. Pressure, temperature and electrical voltage are typical quantities which may be measured in this fashion. For purposes of stability the band of frequencies chosen for such measurements is usually within the upper audio range. Since it is difficult to linearly modulate a frequency source over a very great range, the change in frequency representative of the change in physical quantity is usually rather small. One of the most accurate and versatile known methods of measuring frequency employs a gated counter, wherein periodic signals are counted for a known time period and the resulting count is displayed on a conventional digital display. One difficulty with this method is that at low frequencies a rather long counting period is required to produce an accurate determination of frequency and this in turn increases the possibility that significant variations in frequency occurring during a measurement period may go undetected. If counting periods are shortened to provide more frequent measurements there is introduced an additional problem in that the gated counter has an accuracy of ± one cycle and thus there is introduced an error which varies inversely with the number of cycles sampled and thus duration of the sampling period.

A further difficulty with certain existing systems is that they are not adapted to provide outputs to more than one scale and thus outputs must be rescaled by further computation, mentally by an observer or by means of an auxiliary computer.

SUMMARY OF THE INVENTION

Accordingly it is the object of this invention to provide an improved frequency responsive measurement system. The invention encompasses a system as follows. A varying frequency signal, typically sinusoidal in form, the frequency of which is to be incrementally detected to provide discrete successive values for frequency, or other quantity represented by frequency, is processed by a zero crossing detector which responds by providing a square wave output with transitions between high and low states occurring precisely at times of zero voltage crossings of the input signal. A counter is then employed to count a selected number, for example 50, of the square wave cycles and to provide pulse outputs precisely timed to coincide with the zero crossing of the beginning of the first of the square waves and the ending of the last of the square waves so counted. Thus there is provided timing pulses precisely indicating the duration of a timing interval corresponding to a precise number or sampling of input cycles of the input frequency to be measured. Each timing interval thus is indicative of the average input frequency during a timing interval or sampling period.

A highly stable frequency generator, included in the system, provides a selected frequency output at a frequency substantially higher than the highest input signal to be measured and a gating circuit, controlled by the timing pulses, is connected to the output of the signal generator to pass sets of cycles occurring between timing pulses. Thus, the number in a particular set would vary directly with the period between timing pulses and would vary inversely with the frequency of the input signal during a particular period of sampling. Assuming then the usual case where a readout is desired which varies directly with frequency, the pulses of each set are fed to an appropriately preset down counter which is counted down to a desired minimum or zero count at the lowest input frequency (longest timing inverval) and down fewer counts or none, to a maximum value.

The relationship between parameters is such that the frequency of the frequency generator would be made of increased frequency with increased sampling rates to insure that the gated pulses for a sample period represent a number with sufficient significant digits to reflect the true input frequency, or magnitude of physical condition represented by the input frequency, within the degree of precision provided by the transducer performing translation from the physical condition to electrical frequency.

DESCRIPTION OF THE PREFERRED EMBODIMENT

Figure 2:
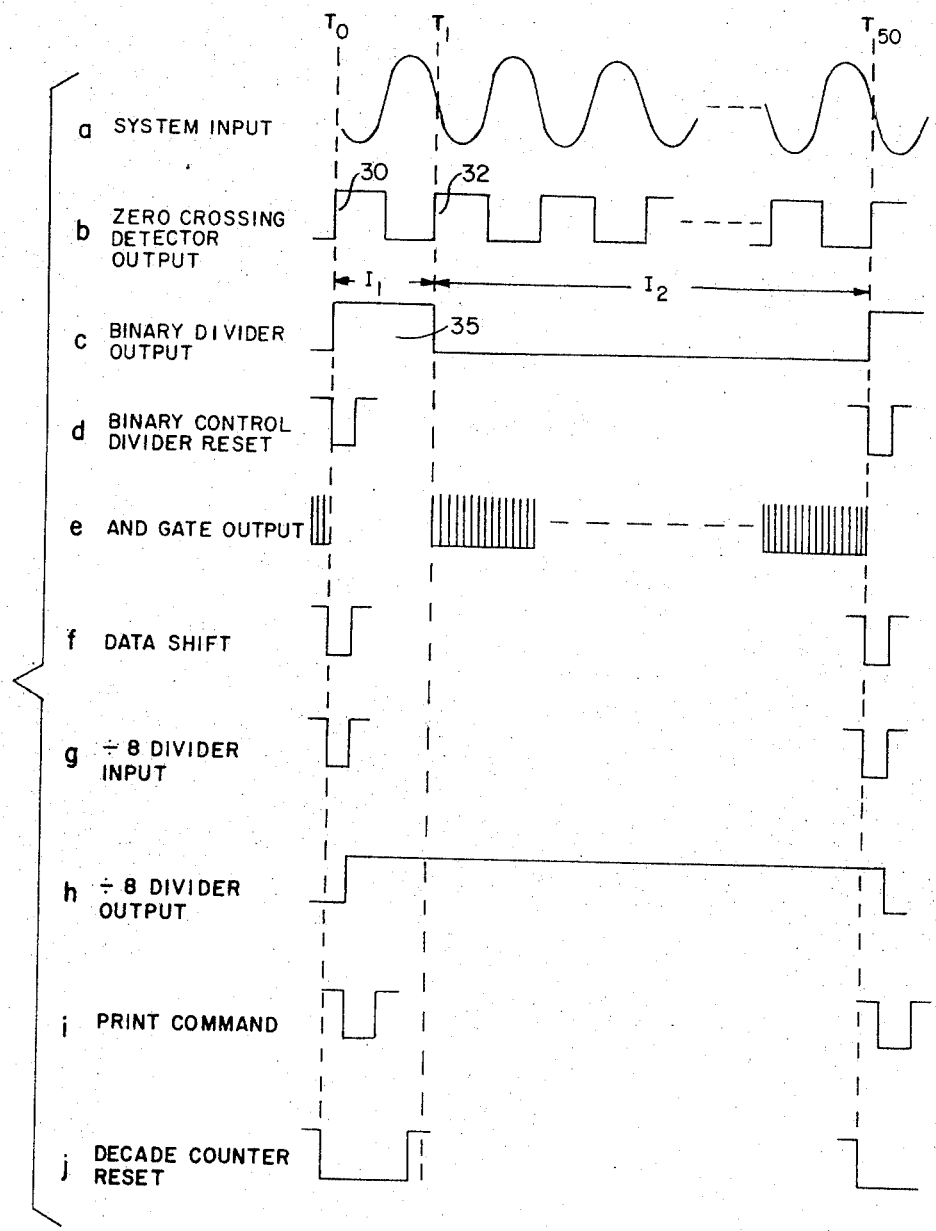
FIG. 2 consists of a series of waveforms illustrative of operation of the invention.

Referring to the drawings, measurement system 10 is divided into three functional circuits: control circuit 12, crystal oscillator circuit 14, and storage and display circuit 16. Pressure transducer 18 is of the type which provides an electrical sinusoidal output signal, waveform a of FIG. 2, which changes in frequency from 10 KHz to 12.5 KHz with changes in sensed pressure between zero and 100 PSI. The output signals from transducer 18 are coupled to the negative input of zero crossing detector 20 of control circuit 12. As indicated by the symbol, zero crossing detector 20 is an operational amplifier with its positive input grounded. It converts the sinusoidal wave signals, waveform a, to square wave signals, waveform b, wherein the leading and trailing edges precisely correspond to zero crossings of input signals.

Figure 1:
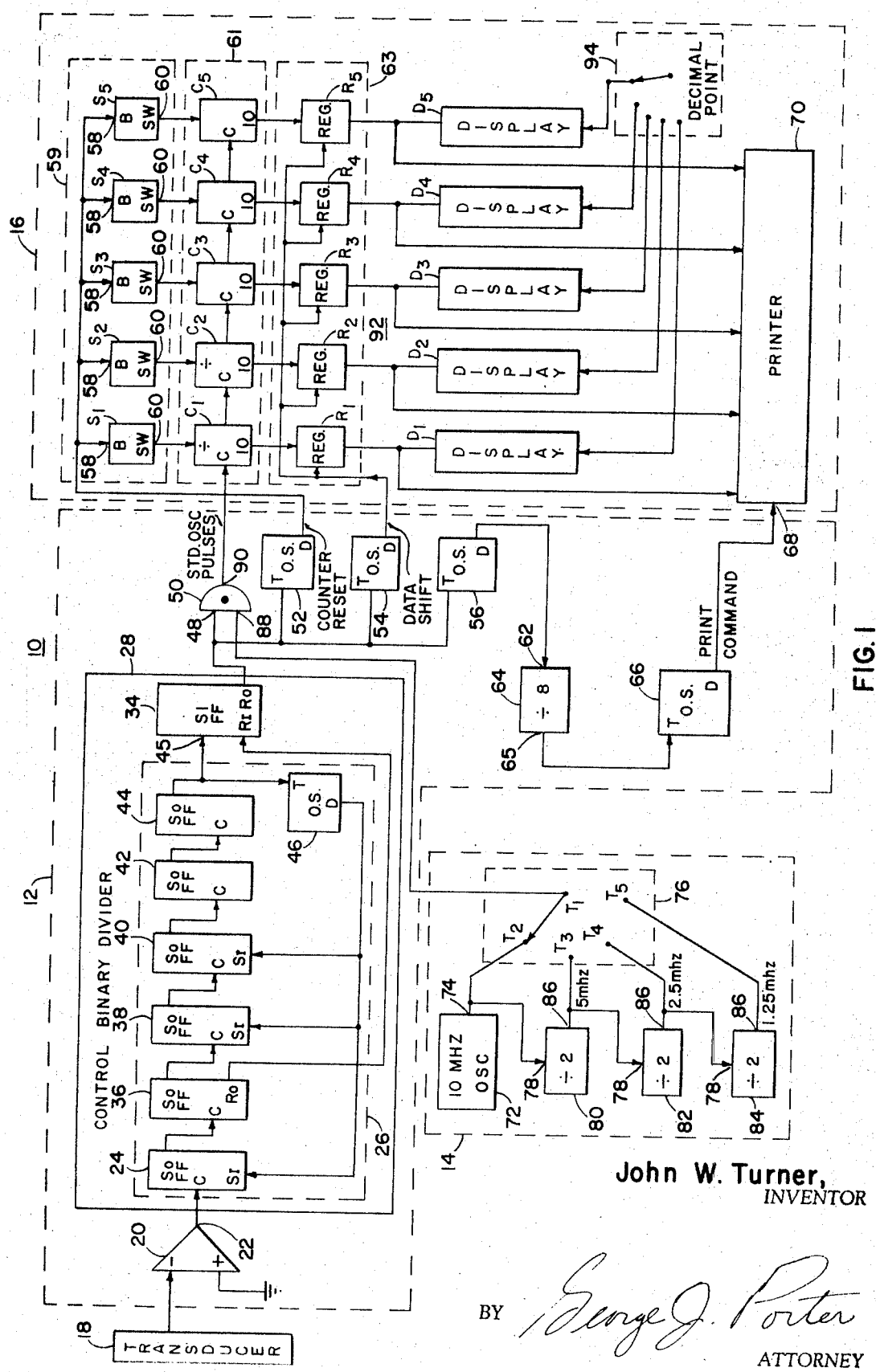
FIG. 1 is an electrical block diagram of an embodiment of the invention.

Output terminal 22 of zero crossing detector 20 is connected to clock input c (FIG. 1) of first stage 24 of six stage binary counter 26 of control binary divider circuit 28. Binary divider circuit 28 generates two basic timing periods of intervals, $I_1$ and $I_2$ and illustrated b/ waveform c. Interval $I_1$ is the "1" output of binary divider circuit 28 and it is initiated at some arbitrary time $T_0$ by the positive going signal 30, waveform 'b, and ends one cycle time later, at time $T_1$ upon the occurrence of positive going signal 32. The second timing interval, interval $I_2$, is triggered by positive going signal 32 at time $T_1$ and is of a duration which is precisely equal to the duration of sequential (except separated by 1 cycle) sets or trains of 50 cycles, ending at time $T_{50}$. Functionally, the period $I_1$ is utilized for resetting circuits of the system between measurements or samplings which are performed during interval $I_2$.

Binary divider circuit 28 comprises binary counter 26 and control flip-flop 34 interconnected as follows. Set output $S_0$ of first stage 24 of binary counter 26 is coupled to clock input C of second stage 36 of counter 26. Set output $S_0$ of second stage 36 and of each succeeding stage 38, 40 and 42 is connected to respective succeeding clock inputs C. Thus counter 26 is connected to perform a conventional binary count. Set output $S_0$ of final stage 44 is coupled to set input $S_I$ of control flip-flop 34 and to trigger input T of one shot 46. Output D of one shot 46 is coupled to set input $S_I$ of counter stages 24, 38 and 40. Being thus connected, each time counter 26 reaches a full count and recycles, output D of one shot 46 resets a binary count of 13 into binary counter 26 and thus counter 26 recycles after each 51 discrete counts, since the maximum count that may be held by counter 26 is 63. Reset input $R_I$ of control flip-flop 34 is coupled to reset output $R_0$ of second stage 36 of binary counter 26, and thus control flip-flop 34 is set by output 45 of counter stage 44 and is reset one cycle time later, as more fully explained hereinafter, by reset output $R_0$ of flip-flop 36.

Reset output $R_0$ of control flip-flop 34 is coupled to one input 48 of AND gate 50, and to trigger input T of one shots 52, 54 and 56. Delayed output D of one shot 52 is coupled to inputs 58 of each of binary coded decimal switches $S_1$-$S_5$ of preset switch 59. Switches $S_1$-$S_5$ have appropriate set and reset inputs to associated binary elements within respective counter stages $C_1$-$C_5$ of decade counter 61. Output D of one shot 54 is connected to internal gating inputs within each of register stages $R_1$-$R_5$ of register 63. Delay output D of one shot 56 is coupled to input 62 of divide-by-eight divider 64 having output 65 in turn connected to input trigger T of one shot 66. Delayed output D of one shot 66 provides a print command to input 68 of printer 70.

Crystal oscillator circuit 14 includes 10 MHz crystal oscillator 72 having output 74 coupled to stationary contact $T_2$ of switch 76 and to input 78 of the first of three cascaded divide-by-two-dividers 80, 82 and 84. Outputs 86 of dividers 80, 82 and 84 are connected to stationary contacts $T_3$, $T_4$ and $T_5$, respectively, of switch 76. Selectable frequencies from crystal oscillator circuit 14 are coupled through movable contact $T_1$ of switch 76 to a second input 88 of AND gate 50.

Output 90 of AND gate 50 is coupled to input C of first stage $C_1$ of decade counter 61 of storage and display circuit 16. Counter 61 comprises five stages, $C_1$-$C_5$, each being internally gated in a manner well known in the art, so as to count down in a decimal order as from decimal nine, or binary 1001 downward through zero or binary 0000, providing a carry to a next sequential stage, $C_2$-$C_5$, on a transition from zero to nine. The BCD output of each of counter stages $C_1$-$C_5$ of counter 61 is coupled to an appropriately gated storage register $R_1$-$R_5$ of register 63, into which BCD numbers from decade counter 61 are shifted by a data shift pulse, waveform f, FIG. 2. The output of each of storage register stages $R_1$-$R_5$ is fed to a similar stage within conventional printer 70 and to an associated decade matrix and display stage $D_1$-$D_5$ of display 92. BCD numbers fed to display 92 are immediately decoded and visually displayed in the form of a five digit decimal number by a conventional display tube. BCD information is gated by internal logic into buffer stages of printer 70, upon the receipt of a print command. Decimal point control 94 of display 92 selectively enables decimal point indicator lamps, not shown, within display stages $D_1$-$D_5$.

Operation

To examine operation of the system, assume that transducer 18 initially senses a zero pressure condition from a source such as a pressure vessel, not shown. A steady state condition of all logic elements within the system at time $T_1$ will be established by assuming that one cycle before, at time $T_0$, representing the end of one sampling or measurement interval $I_2$ (waveform c) control flip-flop 34 is switched to a "set" condition by the output of binary counter 26. The reset output of flip-flop 34, pulse 35, defines reset interval $I_1$, during which a chain of events occur as follows to recycle the system preparatory to taking the next pressure sample. At the beginning of this interval, set output $S_0$ of flip-flop 44 triggers one shot 46 which provides a ten microsecond pulse, waveform d, to set flip-flops 24, 38 and 40 to reset counter 26.

Reset output pulse 35 functions to disable AND gate 50, thus no pulses are gated to input C of decade counter 61. One shots, 52, 54 and 56, which provide necessary sequencing and timing delays, are simultaneously triggered by the leading edge of pulse 35. One shot 54 provides a 10 microsecond pulse to register stages $R_1$-$R_5$ of register 63, the trailing edge of which shifts BCD information resulting from a previous count from counter 61 into storage registers $R_1$-$R_5$ where it is coupled to decode and display stages $D_1$-$D_5$ resulting in an updated visual readout of pressure.

Simultaneously, the output of one shot 56 (waveform g) steps divide-by-eight divider 64, resetting it to zero (waveform h) to trigger one shot 66. One shot 66 provides a 25 microsecond pulse output (waveform i), the trailing edge of which triggers printer 70, which through internal sequencing completes one print cycle before a second print command occurs at the end of eight sample intervals, $I_2$. One shot 52 provides a 70 microsecond pulse (waveform j), the trailing edge of which strobes a decimal count of 50,000, as determined by setting of BCD switches 59, into decade counter 61. Readout system 10 is now in a condition to sample the output of transducer 18.

At time $T_1$ the trailing edge 32 of square wave input b steps counter 26 from a count of 13, binary 1101, to a count of 14, binary 1110. Output $R_0$ from second stage 36 of counter 26 resets control bistable 34. AND gate 50 is now enabled by reset output $R_0$ of bistable 34 and 10 MHz pulses are fed through input 88 of AND gate 50 to input C of decade counter 61 during measuring or sample time interval I$_2$. The output from transducer 18 is 10 KHz, responsive to a pressure input of 0 PSI and the sample time I$_2$ is 0.005 seconds, the period of 50 Hz at a rate of 10 KHz. During this 5 millisecond interval from T$_1$ through T$_{50}$, or T$_2$ of FIG. 2, 50,000 hertz, pulses, from 10 MHz standard oscillator 72 occur and thus subtract 50,000 counts from decade counter 61. At T$_0$, output 45 again "sets" control bistable 34, completing one sample time. After data shift pulse f, the decimal number now displayed by display stage modules D$_1$-D$_5$ is 00000 (000.00 with decimal selected by decimal point control 94) representing zero pressure, since the count of 50,000 which was initially strobed into decade counter 61 is now reduced to zero.

In order to illustrate a full scale reading, it will be assumed that a 100 PSI pressure is applied to transducer 18. Once again, during reset interval I$_1$, measurement system 10 recycles as before and a count of 50,000 is reset into decade counter 61. At T$_1$, rest output R$_0$ of control bistable 34 enables AND gate 50 and pulses from crystal oscillator 72 are gated into decade counter 61 for an interval of 50 cycles of output from transducer 18. The output frequency from transducer 18 is now 12.5 KHz, representing the input pressure of 100 PSI. Sample time I$_2$ is now 0.004 seconds, the period of 50 hertz occurring at the rate of 12.5 KHz. During this period 40,000 pulses from crystal oscillator 72 are subtracted from counter 61 leaving a remainder of 10,000 counts. The number now displayed in decade stages D$_1$-D$_5$ is thus 100.00 (with correct selection of decimal point) representing an input pressure of 100 PSI. By appropriate setting of the decimal point control 94 the reading directly represents pressure from transducers 18 having full scale readings based on a zero minimum value to a maximum value of any integral powers of 10 from $10^0$ to $10^4$.

It also follows that minimum gate time for full scale input will be 0.004 seconds, or 50 cycles at 12.5 KHz regardless of the pressure range of the transducer in use. Thus, sample time I$_2$ is, by design, inversely related to the pressure being measured. As has been shown, the preset count in decade counter 61 is reduced in direct proportion to the sample time I$_2$, with the count remaining at the end of the sample time I$_2$ being the value of the pressure being measured. This arrangement permits a direct readout of pressure to be made while using a minimum of equipment. By the use of selectable dividers 80, 82 and 84 following the 10 MHz standard oscillator 72 and by a selectable preset count, within counter 61, as determined by settings of BCD switches 59, it is possible to display results which are directly representative of full scale readings of 1.25, 2.5 and five times any integral power of ten from $10^0$ through $10^3$. This enables the covering of most convertible ranges at maximum accuracy.

As another example assume a selected transducer 18 reads zero minimum through 500 PSI full scale. The circuitry of readout system 10 would be set up as follows to interpret input pressure. Set movable arm T$_1$ of selector switch 76 to contact T$_3$, which is the output 86 of divide-by-two divider 80. The output of crystal oscillator circuit 14 is now 5 MHz. Next, set BCD switches 59 to a preset count of 25,000. If zero pressure is being exerted on transducer 18 during sample time I$_2$, which would be 0.005 seconds, 25,000 pulses will be subtracted from decade counter 61, reducing the indicated count to 00000. When decimal point is properly placed there results a reading of 0000.0. With 500 PSI pressure being applied to transducer 18 during interval I$_2$, 20,000 pulses will be subtracted from counter 61 since interval I$_2$ is now 0.004 seconds. This leaves a remainder in counter 61 of 05000, which when displayed with decimal point placed, as shown, reads 0500.00, or 500 PSI. With circuitry of the system set up to read 500 PSI as in the example above, the output pressure from transducers having full scale readings of 5, 50, 500 and 5,000 PSI can be read directly, assuming, of course, the decimal point is placed in the proper position and the same range of signal frequencies are provided by the transducer.

Thus from the foregoing examples it is to be noted that scale factors of transducers can be directly provided by selecting a frequency in MHz from crystal oscillator circuit 14 which corresponds to the significant number or numbers of a full scale reading. To the extent of a selected reduction of the 10 MHz output of crystal oscillator 14, there would be a like proportional reduction of the preset count provided counter 61 by preset switch 59. As an example, if the frequency in megahertz from output 86 of divide-by-two divider 82 used which is one-fourth of 10 MHz, or 2.5 MHz, then using this as a multiplier, multiplied by $10^0$ through $10^3$, transducers with scale factors of a minimum of zero through maximum values of 2.5, 25, 250 or 2,500 PSI may be directly provided by the system. In such case reset switch 59 would be set at one-fourth of 50,000 counts or 12,500 counts. Then at a zero pressure input in each case, the 2.5 MHz pulses would fully subtract 12,500 counts and at maximum pressure would subtract 10,000 counts, leaving a remainder of 2,500 counts.

Thus far, only zero and maximum static pressures have been discussed, however, since sample time I$_2$ is directly proportional to the pressure applied, then it follows that static values of inputs between zero and maximum pressure will produce the desired proportional output readings from the system. Under static conditions, the accuracy of the system is dependent largely upon the stability of crystal oscillator 72. In the illustrated system, the accuracy is on the order of 0.05 percent for static measurements. Under dynamic conditions, since the readout is averaged over the gate period I$_2$, it is in error by one-half the change during this period. With a sample rate of 250 samples per second and a rate of change of 100 PSI per second, the error can only be 0.25 percent, representing an accuracy which is believed to be a substantial improvement over that provided by existing systems.

What is claimed is:

1. A measurement system for providing a series of discrete outputs indicative of the frequency of a source of variable frequency energy for discrete sampled periods comprising:
   a source of fixed frequency energy providing an output of a preselected frequency which is higher in frequency than the highest frequency of the source of variable frequency energy to be measured;
   timing means responsive to the output of said source of variable frequency energy for repetitively providing timing pulses marking the beginning and end of a selected like number of complete cycles of said source of variable frequency energy and denoting a sample period; and cycle counting means responsive to said timing pulses and said source of fixed frequency energy for sequentially counting cycles of said source of fixed frequency energy occurring between said timing pulses and for providing as said discrete outputs a series of discrete counts, each indicative of the average frequency of said source of variable frequency energy for a said sample period.

2. A measurement system for providing a series of discrete outputs, each being proportional to the magnitude of a physical quantity represented by an electrical signal varying directly in frequency with changes in said magnitude, comprising:

a source of fixed frequency energy providing an output higher in frequency than the highest frequency of said signal;

timing means responsive to said signal for providing timing pulses marking the beginning and end of sets of like numbers of complete cycles of said signal and defining sample periods for said discrete outputs; and cycle counting means responsive to said timing pulses and said source of fixed frequency energy for sequentially counting said cycles occurring between said timing pulses and for providing as said discrete outputs a series of discrete counts proportional to the average said magnitude of said physical quantity for a said sample period.

3. A measurement system as set forth in claim 2 wherein said cycle counting means includes a countdown counter, presettable after each said discrete output to a selected value and the frequency of said source of fixed frequency energy is selected to count down said countdown counts to a value corresponding to the lowest magnitude of said physical quantity, represented by a maximum said sample period, and to a maximum value corresponding to the maximum magnitude of said physical quantity, represented by a minimum said sample period.

4. A measurement system as set forth in claim 3 wherein the said minimum value of a said physical quantity is zero and said frequency of said source of fixed frequency energy is selected to fully count down said countdown counter in a maximum said sample period.

5. A measurement system as set forth in claim 4 wherein:

said source of fixed frequency energy comprises means for selectively providing a plurality of different fixed frequency outputs enabling the selected scaling of counts indicated by said hertz counting means to correspond with the scale of magnitude of physical quantity versus frequency of said signal; and said countdown counter comprises means for selectively setting therein a preset count.

* * * * *